Nov. 15, 1966  C. S. COCKERELL  3,285,356
VEHICLES FOR TRAVELLING OVER LAND AND/OR WATER
Filed May 6, 1965
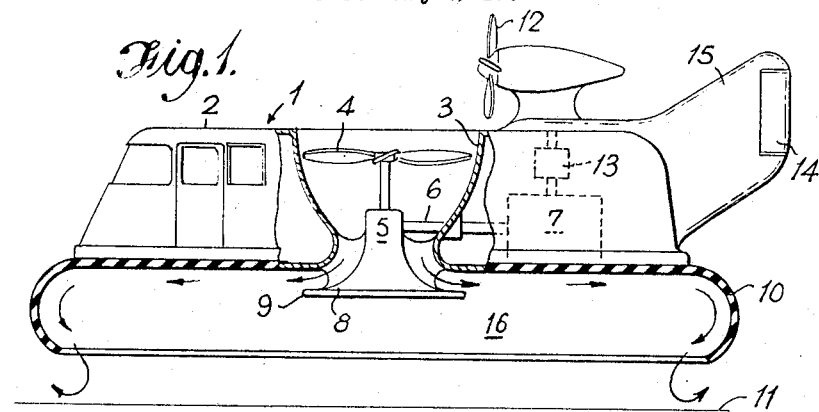
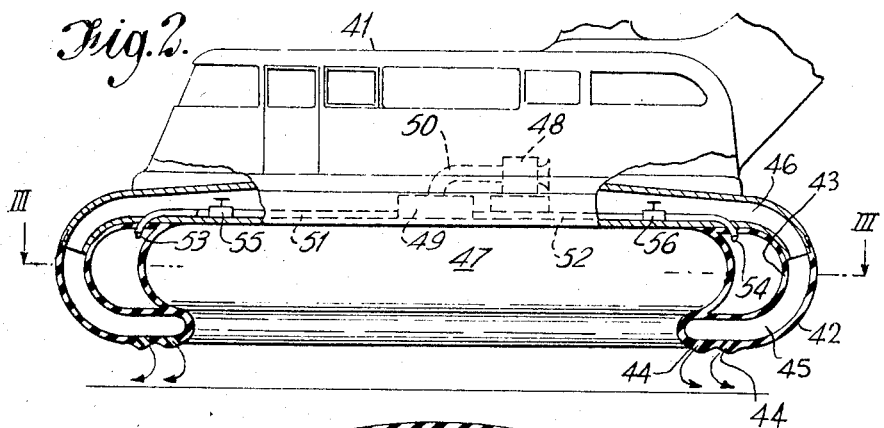
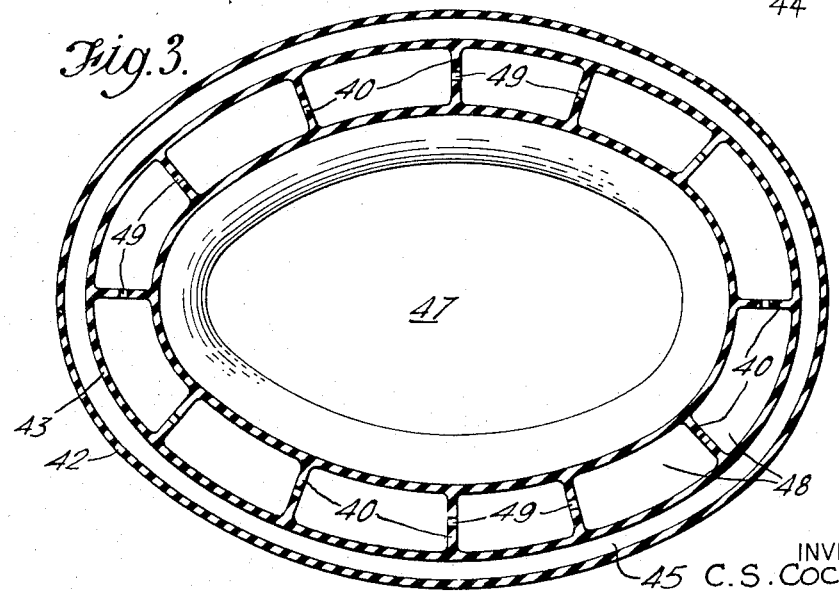
INVENTOR
C. S. COCKERELL
BY Cameron, Kerkam & Sutton
ATTORNEYS

# United States Patent Office 3,285,356
Patented Nov. 15, 1966

3,285,356
VEHICLES FOR TRAVELLING OVER LAND AND/OR WATER
Christopher Sydney Cockerell, Bassett, Southampton, England, assignor to Hovercraft Development Limited, London, England, a company of Great Britain and Northern Ireland
Filed May 6, 1965, Ser. No. 453,687
Claims priority, application Great Britain, Sept. 1, 1958, 27,978/58
3 Claims. (Cl. 180—7)

This is a continuation-in-part of applications Serial Nos. 837,502 filed September 1, 1959, and 329,562, filed December 10, 1963, now patents Nos. 3,182,739 and 3,182,740, respectively.

This invention relates to vehicles for travelling over a surface and which, in operation, are supported above that surface by one or more cushions of pressurised gas formed and contained beneath the vehicle body.

In particular this invention is concerned with such gas-cushion supported vehicles in which at least part of the peripheral boundary of gas cushion is formed by flexible means extending below the body of the vehicle as described and claimed in said Patent Nos. 3,182739 and 3,182,740.

It is, of course, desirable that the flexible wall by which the gas cushion is contained should be returned to its normal extended position as effectively and as rapidly as possible whenever it is displaced by contact with some obstruction on the surface over which the vehicle is travelling. On the other hand, the wall structure should be as light and as flexible as possible. It is an object of this invention, therefore, to provide a flexible wall structure for containing the gas cushion of a gas cushion supported vehicle which will be easily deflectable by contact with obstructions on the surface while being capable of sustaining the pressure of the gas cushion.

It is a further object of the invention to provide a wall structure for a gas cushion supported vehicle which, while being flexible, will be restored to its normal undeflected condition rapidly after it has been deflected by contact with an obstacle.

Another object of the invention is to achieve these results with a structure which is light in weight.

According to this invention, therefore, a flexible wall structure for a gas cushion vehicle is provided which is so formed that the pressure of the gas cushion operates upon the wall and itself provides the restoring force required to restore the wall to its normal undeflected condition. This effect can be achieved, for example by constructing the flexible wall so as to have a concave inner surface presented towards the gas cushion space so that the pressure within the gas cushion space operates upon the inner surface of the flexible wall with a component which is downwards towards the surface over which the vehicle is travelling and so assists gravity in restoring the wall to its normal configuration.

In gas cushion vehicles of the type to which this invention relates it is sometimes provided that the gas cushion is in part contained by a curtain of moving fluid which is directed downwardly towards the surface. This expedient is applicable in the case of the present invention.

In one form which the wall structure according to the invention may take it is made of flexible gas-tight material and is hollow and is inflated so as to be maintained in the distended shape required to form an effective wall structure for containing the gas cushion. In order that the provision according to this invention may apply to such a structure the pressure to which the structure is inflated is made less than that of the gas cushion. The flexible wall of the inflated structure presented towards the gas cushion will in these circumstances present a concave surface towards the gas cushion and a downward component of pressure will be exerted by the gas cushion upon the lower part of the flexible structure as to provide a restoring force in augmentation of that which the inflated flexible structure itself provides by reason of its own resilience.

If such a structure is employed it is preferred to divide it into a number of cells, for example by means of gas-tight membranes bridged across its cross-section so that if there is a displacement of the wall structure at any given point of the periphery the pressure in the inflated structure at that point will be raised and the increase of pressure thus generated will not be dissipated towards other regions of the structure but will be available to provide a restoring force at the point of displacement. With such a structure the stiffness of the wall can, of course, be controlled by controlling the inflation pressure of the inflated structure. Obviously by dividing the structure into separate cells it becomes possible to inflate these cells to different inflation pressures so as to provide different characteristics at different regions of the periphery. This control of the inflation pressure may be carried out on a basis of fixed inflation pressures or the inflation pressures may be made variable so as to provide different characteristics according to the different conditions which the vehicle is expected to encounter from time to time.

In order that the invention may be more readily understood and carried into effect some embodiments thereof will now be described with reference to the accompanying drawings in which:

FIGURE 1 is a side elevation partly in cross section of a simple form of vehicle according to the invention, FIGURE 2 is a diagrammatic side elevation partly in cross section of a further vehicle according to the invention, and FIGURE 3 is a section on the line III—III of FIGURE 2.

The vehicle shown in FIGURE 1 comprises a body structure 1 carrying a control cabin 2 and including passenger and/or cargo space. Through the centre of the body structure passes a duct 3 in which is mounted a fan 4 driven, through gear box 5 and shaft 6, by a motor 7 and serving to draw air down through the duct. At the lower end of the duct the air is deflected by the fairing 8 and by a deflector plate 9 so as to flow in radially outward directions over the under surface of the body structure.

Around the periphery of the body structure there is suspended a flexible skirt structure 10 which is shown as of curved cross section so as to present a concave surface towards the space 16 beneath the vehicle. The skirt 10 may be made of any flexible sheet material such as rubber or canvas or composite structures in which, say, rubber is reinforced with cords or fabric. The air delivered by the fan 4 to the underside of the vehicle builds up a pressurised cushion within the space 16 bounded by skirt 10 sufficient to raise the vehicle off the ground. The skirt 10 serves to retain the pressurised air under the vehicle. When the vehicle lifts off sufficiently the air flowing radially outwardly towards the periphery of the vehicle is deflected by the skirt 10 round and down so as to be directed inwardly from the lower edge of the skirt and to issue from the lower edge in the form of a curtain of air which itself serves to resist the flow of air outwardly from the pressurised cushion. The vehicle is thus lifted higher until there is a clear space between the lower edge of the skirt 10 and the ground. The air forming the curtain issuing from the lower edge of skirt 10 flows across the gap and is bent around by the pressure of the air within the space below the vehicle until it flows outwardly and escapes.

The vehicle is thus supported on a pressurised air cushion which is contained around the upper part of its periphery by the flexible skirt 10 and around the lower part of the periphery by a curtain of moving air. While so supported the vehicle may be driven over the surface of the ground 11 by means, for example, of an air screw 12 which either may be driven from the motor 7 through a further gearbox 13 or may be driven separately. The vehicle may be steered, for example, by means of a fin 14 mounted on a stabilising fin 15.

When so driven the vehicle will obviously ride without difficulty over any obstacles or irregularities on the surface 11 which are not high enough to be hit by the skirt 10. Higher obstacles will be hit by the skirt 10 but because of its flexibility the skirt 10 will yield and the vehicle will pass over the obstacle without suffering any undue shock.

Because of the concave shape of the skirt 10 the pressure of air within the cushion space 16 below the vehicle will keep it inflated and distended to the shape shown and will restore it to its proper shape after it has been deflected by impact with an obstacle.

The vehicle of FIGURES 2 and 3 is a more advanced structure. In the underside of the main body of the vehicle shown diagrammatically at 41 there is provided an annular port 46. Attached around the inner periphery or lower wall of port 46 is a hollow flexible tubular structure 43 which is closed upon itself and arranged to be inflated to a pressure slightly less than that which will be set up in the pressurised cushion which it surrounds. The structure 43 may be completely sealed and permanently inflated or may be supplied with gas from the main compressor plant referred to below or from an auxiliary plant as may be convenient. For this reason the inner wall of the structure will assume a concave shape (as seen from within the cushion space) as shown. Surrounding the tubular structure 43 and attached to the outer margin or upper wall of port 46 is an outer flexible skirt member 42 which forms between itself and the outer surface of tube 43 an annular flexible duct 45 by which air from a compressor plant (not shown) carried by the vehicle may be delivered to ports 44 located in the under surface of the duct where it curves under the tubular structure 43. Two ports 44 are shown and from them issue curtains of air, indicated by the arrows, which flow downwardly towards the ground and are bent round by the pressure of the air cushion within the space 47 beneath the vehicle so as to finally flow outwardly away from the vehicle.

The region between the two curtains of air will assume a pressure intermediate that of the main supporting air cushion under the main structure of the vehicle and that of the surrounding atmosphere, this pressure acting upwardly on the under surface of the duct 45 between the ports 44. Therefore, if the vehicle tends to tilt downwards towards the ground at any given point around the periphery of the craft, the pressure within the region between the curtains will tend to rise and exert an increased upward force on the structure 43, 45 tending to lift it and maintain it out of contact with the ground surface.

The cross-sectional diagram of FIGURE 3 shows a cross-section of the tubular structure 43 surrounded by the duct 45. It also shows radial membranes 40 also of flexible material which are provided at spaced points around the flexible skirt or wall structure, dividing the space within the tubular structure 43 into a number of cells 48. Since each of these cells can sustain pressure within itself different from that of its fellows it will be readily understood that an increased stability will be achieved since the increased pressure in a cell due to tilting of the vehicle will be retained at the location at which it is set up and will be fully effective at that point to exert an upward restoring force on the vehicle instead of being dissipated around the periphery as it would be in the absence of the membranes or diaphragms 40. The magnitude of this effect can of course be determined by suitable choice of the cell sizes and/or by permitting restricted flow of air between the cells by the provision, for example, of holes 49 in the diaphragms 40.

Alternatively the individual cells may be inflated separately for example by means of a motor driven pump 48 which maintains constant pressure in a plenum chamber 49 by pumping air through duct 50. From the plenum 49 pressure lines 51, 52 distribute the pressurised air nozzles 53, 54 in the individual cells. The inflation pressures in the individual cells may be predetermined by suitable adjustment of pressure reducing valves 55, 56 or these valves may be controlled either manually or automatically to accommodate varying requirements of stiffness in the inflated structure as circumstances may require. A restricted amount of leakage may be provided for from each cell so that the pressure may fall within the cell if the air supply to it is reduced by operation of the corresponding valve 55.

I claim:
1. A vehicle of the type adapted for travelling or hovering over the surface of land or water comprising a structure including a main body, means carried by said body for forming and maintaining a pressurised cushion of gas between the structure of the vehicle and the surface over which the vehicle is travelling or hovering, capable of at least partially supporting the vehicle above said surface, a flexible wall structure constituting at least part of the peripheral boundary within which said pressurised cushion is formed, said wall structure depending below said main body and having a concave inwardly extending surface exposed to the pressure of said cushion so as to be urged by said pressure towards a fully extended configuration and restored to said configuration by said pressure after deflection by contact with an obstacle or irregularity on said surface.

2. A vehicle as claimed in claim 1 wherein said wall structure is in the form of an inflated flexible bag having inner and outer membranes, said bag being inflated to an inflation pressure less than the pressure of said cushion whereby the inner membrane of said structure is maintained in concave form by said cushion pressure.

3. A vehicle as claimed in claim 2 wherein said inflated flexible wall structure is subdivided into a plurality of individual cells by membranes extending transversely to the inner and outer membranes, each of said cells being capable of sustaining a different inflation pressure, said vehicle including means for inflating each of said cells, and means for controlling the individual inflation pressure of at least one of them.

References Cited by the Examiner

UNITED STATES PATENTS

| 1,123,589 | 1/1915 | Porter. | |
| 1,698,482 | 1/1929 | Nicin | 180—7 |
| 2,747,787 | 5/1956 | Seck. | |
| 3,177,959 | 4/1965 | Gaska | 180—7 |
| 3,182,739 | 5/1965 | Cockerell | 180—7 |
| 3,182,740 | 5/1965 | Cockerell | 180—7 |

FOREIGN PATENTS 246,358   9/1960   Australia.

OTHER REFERENCES

Publication, "Aviation Week," July 6, 1959; pp. 115, 116.

A. HARRY LEVY, *Primary Examiner.*